United States Patent
Novich et al.

[11] Patent Number: 6,042,305
[45] Date of Patent: Mar. 28, 2000

[54] FIBER-REINFORCED SOIL MIXTURES

[75] Inventors: Bruce E. Novich, Pittsburgh, Pa.; Ali Maher, Skillman, N.J.; Jeffrey A. Neubauer, Pittsburgh, Pa.

[73] Assignee: PPG Industries Ohio, Inc., Cleveland, Ohio

[21] Appl. No.: 08/917,790

[22] Filed: Aug. 15, 1997

[51] Int. Cl.⁷ ............... C09K 17/04; C09K 17/06; C09K 17/08; C09K 17/40

[52] U.S. Cl. ............... 405/266; 405/263; 106/900

[58] Field of Search ............ 405/263–266; 106/900

[56] References Cited

U.S. PATENT DOCUMENTS

| | | | |
|---|---|---|---|
| Re. 24,820 | 5/1960 | O'Brien et al. | 47/1 |
| 3,076,717 | 2/1963 | Minnick | 106/710 |
| 3,233,365 | 2/1966 | Bergann | 47/1.2 |
| 3,421,326 | 1/1969 | Vidal | 61/39 |
| 3,713,253 | 1/1973 | Urban | 47/58 |
| 3,869,308 | 3/1975 | Graham | 117/126 GB |
| 4,015,994 | 4/1977 | Hill | 106/99 |
| 4,073,753 | 2/1978 | Hauge | 260/2.3 |
| 4,084,381 | 4/1978 | Cain et al. | 405/266 |
| 4,105,463 | 8/1978 | Angelbeck | 106/900 X |
| 4,199,366 | 4/1980 | Schaefer et al. | 106/90 |
| 4,233,015 | 11/1980 | Teague et al. | 405/263 |
| 4,403,891 | 9/1983 | Ohoka et al. | 405/264 |
| 4,477,522 | 10/1984 | Sheehan | 428/359 |
| 4,496,267 | 1/1985 | Gnaedinger | 404/82 |
| 4,521,452 | 6/1985 | Highsmith | 405/264 X |
| 4,645,381 | 2/1987 | Leflaive et al. | 405/258 |
| 4,662,946 | 5/1987 | Mercer | 106/281 R |
| 4,790,691 | 12/1988 | Freed | 405/263 |
| 4,819,933 | 4/1989 | Armond | 272/3 |
| 4,867,614 | 9/1989 | Freed | 405/263 |
| 4,871,283 | 10/1989 | Wright | 405/263 |
| 4,900,010 | 2/1990 | Wengmann et al. | 272/3 |
| 4,900,194 | 2/1990 | Audouin | 405/258 |
| 4,916,855 | 4/1990 | Halliday et al. | 47/58 |
| 5,038,555 | 8/1991 | Wu et al. | 57/249 |
| 5,123,783 | 6/1992 | Yoshida et al. | 405/263 |
| 5,141,365 | 8/1992 | Smart | 405/266 X |
| 5,145,285 | 9/1992 | Fox et al. | 405/258 |

(List continued on next page.)

FOREIGN PATENT DOCUMENTS

| | | |
|---|---|---|
| 0122995 | 10/1983 | European Pat. Off. |
| 0135478 | 8/1984 | European Pat. Off. |
| 0136747 | 8/1984 | European Pat. Off. |
| 0 736 587 | 10/1996 | European Pat. Off. |
| 55-124582 | 9/1980 | Japan . |
| WO88/02419 | 4/1988 | WIPO . |
| WO 94/28248 | 12/1994 | WIPO . |
| WO94/28248 | 12/1994 | WIPO . |
| WO97/21876 | 6/1997 | WIPO . |
| WO97/27368 | 7/1997 | WIPO . |

OTHER PUBLICATIONS

D. J. Hoare, "Laboratory study of granular soils reinforced with randomly oriented discrete fibres", *C. R. Coll. Int. Renforcement des Sols.* Paris 1979, pp. 47–52.

H. Vidal, "Reinforced Earth (A New Material for Public Works", U.S. Army Engineer Waterways Experiment Station, Corps of Engineers, Vicksburg, Mississippi, (Dec. 1967).

(List continued on next page.)

*Primary Examiner*—David Bagnell
*Assistant Examiner*—Tara L. Mayo
*Attorney, Agent, or Firm*—Ann Marie Cannoni; Andrew C. Siminerio

[57] ABSTRACT

The present invention provides semi-solid and reinforced soil mixtures formed from aqueous soil mixtures such as dredge material, discrete reinforcing fibers such as glass fibers. The reinforced mixtures can include additives for partially solidifying the aqueous soil mixture, such as calcium-containing materials, cementitious materials, silicon-containing materials, aluminum-containing materials and mixtures thereof. The pH of the reinforced soil mixture can be adjusted to control deterioration of the reinforcing fibers, as desired.

41 Claims, 5 Drawing Sheets

U.S. PATENT DOCUMENTS

| | | | |
|---|---|---|---|
| 5,184,917 | 2/1993 | Rez | 405/266 X |
| 5,226,255 | 7/1993 | Robertson | 47/56 |
| 5,263,797 | 11/1993 | Lindstrom et al. | 405/266 |
| 5,294,255 | 3/1994 | Smetana et al. | 405/266 X |
| 5,326,192 | 7/1994 | Freed | 405/258 |
| 5,340,397 | 8/1994 | Brothers | 405/266 X |
| 5,344,470 | 9/1994 | Molnar et al. | 47/58 |
| 5,368,626 | 11/1994 | Schnuda | 71/23 |
| 5,401,312 | 3/1995 | Hanst | 405/266 X |
| 5,404,671 | 4/1995 | Farrow, Jr. et al. | 47/1.01 |
| 5,456,737 | 10/1995 | Manning | 71/16 |
| 5,458,195 | 10/1995 | Totten et al. | 166/293 |
| 5,507,845 | 4/1996 | Molnar et al. | 47/1.01 |
| 5,542,977 | 8/1996 | Hanst | 106/900 X |
| 5,555,674 | 9/1996 | Molnar et al. | 47/56 |
| 5,562,587 | 10/1996 | Kessler et al. | 405/263 X |
| 5,569,324 | 10/1996 | Totten et al. | 405/266 X |
| 5,577,865 | 11/1996 | Manrique et al. | 405/266 |
| 5,588,783 | 12/1996 | Brabston et al. | 405/258 |
| 5,658,097 | 8/1997 | Komori et al. | 405/263 |
| 5,683,208 | 11/1997 | Fage et al. | 405/263 |
| 5,707,443 | 1/1998 | Brown et al. | 405/266 X |
| 5,730,549 | 3/1998 | Choudin et al. | 404/75 |
| 5,746,546 | 5/1998 | Hubbs et al. | 405/263 |
| 5,814,147 | 9/1998 | Tallard | 405/266 X |
| 5,820,302 | 10/1998 | Roberts et al. | 405/266 X |

OTHER PUBLICATIONS

D. Gray et al., "Mechanics of Fiber Reinforcement in Sand", pp. 335–353.

*Control of Slope Erosion Using Fiberglass Roving with Vegetation*, California State Dept. of Transportation, Sacramento, FHWA–CA–78–4, PB–292 667 (Oct. 1978).

"Fiber Glass Spray–On Web Combats Soil Erosion Damage", News Release from PPG Industries, Inc. 1975.

"Blanket Protection Against Soil Erosion", *PPG Products Bulletin* vol. 84, No. 1 (1976).

D. Gray, "Behavior of Fabric—Versus Fiber–Reinforced Sand", *Journal of Geotechnical Engr.*, Vo. 112, No. 8 (Aug. 1986) pp. 804–820.

T. Al–Refeai, *Constitutive Behavior of Fabric vs. Fiber Reinforced Sand*, UMI Dissertation Services (1985).

D. Gray et al., "Internal/External Fabric Reinforcement of Sand", Second Int'l. Conf. on Geotextiles Session 2C: Walls and Foundations, (Las Vegas 1982) pp. 611–616.

O. Andersland et al., "Shear Strength of Kaolinite/Fiber Soil Mixtures", C. R. C II. Reinforcement des Sois (Paris 1979), pp. 11–15.

R. Arenicz et al., "Laboratory Investigation of Earth Walls Simultaneously Reinforced by Strips and Random Reinforcement", American Society for Testing and Materials 0149–6115/88/0012–0241 (1988).

E. LeFlaive, "The Reinforcement of Granular Materials with Continuous Fibers", Second Intl. Conf. on Geotextiles, Session 5C: Slopes and Embakments III (Las Vegas 1986).

M. Fatani et al., "Reinforcing Soil with Aligned and Randomly Orieted Metallic Fibers", *Geotechnical Testing Journal*, vol. 14, No. 1 (Mar. 1991) pp. 78–87.

K. Habibagahi et al, "Methods of Improving Low–Cost Construction Materials Against Earthquake", *New Horizons in Construction Materials*, Envo Publishing Co., Inc., Library of Congress #76–27387 (1974), pp. 461–475.

M. Maher et al, "Static Response of Sands Reinforced with Randomly Distributed Fibers", 116 Journal of Geotechnical Engr. II (Nov. 1990), pp. 1661–1677.

M. Maher et al, "Dynamic Response of Sand Reinforced with Randomly Distributed Fibers", vol. 116 Journal of Geotechnical Engr. No. 7 (Jul. 1990), pp. 1116–1131.

M. Maher et al, "Mechanical Properties of Kaolinite/Fiber Soil Composite", Journal of Geotechnical Engr., vol. 120, No. 8 (Aug. 1994), pp. 1381–1393.

*Hawley's Condensed Chemical Dictionary* (3d Ed. 1993), pp. 24, 42, 47, 100, 155, 201, 204–205, 208, 239, 288, 290–291, 353, 533, 580, 699–700, 788–789, 1035, 1036.

*Webster's Third New International Dictionary* (1971), p. 2065.

B. Das, *Principles of Geotechnical Engineering*, (3d Ed. 1994), pp. 7–8.

ASTM Method D 3282–92 (1992).

ASTM Test Method D 4318.

Chilton & Perry, *Chemical Engineers' Handbook*, (5th Ed. 1973), pp. 19–13 to 19–14.

K. Loewenstein, *The Manufacturing Technology of Glass Fibres* (3d Ed. 1993), pp. 25, 30–44, 47–60, 115–122, 126–135, 165–172, 219–222, 237–291.

*Encyclopedia of Polymer Science and Technology*, vol. 6 (1967), pp. 505–712.

Kirk–Othmer, *Encyclopedia of Chemical Technology*, (1964) Vo. 4, pp. 684–710.

ASTM Method D 4972–89 (1989).

FIBER-REINFORCED SOIL MIXTURES

FIELD OF THE INVENTION

This invention relates generally to fiber-reinforced soil mixtures for geotechnical engineering applications, and more particularly to semi-solid fiber-reinforced soil mixtures formed from aqueous soil mixtures, dried soil mixtures formed from the same and methods for making semi-solid and dried fiber-reinforced soil mixtures.

BACKGROUND OF THE INVENTION

In geotechnical engineering applications, such as load bearing construction, erosion control and vegetation support, the engineering properties of the soil can have a significant influence on site reclamation and development operations, transportation infrastructure construction, and general construction costs and configurations. The components of the soil can influence the soil's load bearing capability, stability, resistance to lateral movement, drainage and settling characteristics. Desirable soil characteristics include high shear strength, low compressibility, good compactibility, high permeability, high ductility, low weight and high density.

In an attempt to improve soil properties, U.S. Pat. Nos. 4,790,691 and 4,867,614 disclose composite mixtures of natural soil selected from gravel, sand, silt and clay and about 0.1 to 5 percent by weight of a fiber additive including glass fibers, thermoplastic fibers and man-made fiber forming substances such as cellulosic and non-cellulosic or synthetic base materials.

Currently there is great interest in reclaiming waste materials for geotechnical applications. For example, Japanese Patent Application No. 55-124582 discloses a solidification method for waste matter in powdered form or waste matter in sludge form which is first dehydrated and dried to produce powdered waste matter. Examples of powdered waste matter disclosed include incineration ash, powdered waste matter from exhaust gas cleaning processes and powdered waste matter formed from sludge having inorganic substances as primary constituents, such as water supply sludge, plating sludge, slag and red mud. The powdered waste matter is mixed with a fibrous reinforcing material and, if necessary, a solidification accelerating agent, molded in the presence of a calcium constituent and solidified in a steam autoclave. However, this process involves costly drying of the waste materials and high pressure molding to produce a useable product. Processing of aqueous soil mixtures is not discussed.

In an existing commercial process, dredge material including sand, silt, organic material, trace metallic waste material and water is pumped from the floor of the ocean. The dredge material is mixed with lime or Portland cement in a pug mill to form a semi-solid soil material, which is then air-dried for about a week and used as soil for fill and building support applications.

It is desirable to enhance the physical properties of soils formed from aqueous soil mixtures such as dredge material for geotechnical engineering applications, to improve the processibility of such materials and to reduce the cost and/or time for drying such materials.

SUMMARY OF THE INVENTION

One aspect of the present invention is a semi-solid reinforced soil mixture, comprising: (a) an aqueous soil mixture comprising: (i) a mineral soil selected from the group consisting of gravel, sand, silt, clay and mixtures thereof; (ii) an organic material; and (iii) about 10 to about 95 weight percent water on a basis of total weight of the aqueous soil mixture; and (b) a plurality of discrete reinforcing fibers for reinforcing the aqueous soil mixture to form a semi-solid reinforced soil mixture.

Another aspect of the present invention is a semi-solid reinforced soil mixture, comprising: (a) an aqueous soil mixture comprising: (i) a mineral soil selected from the group consisting of gravel, sand, silt, clay and mixtures thereof; and (ii) about 10 to about 95 weight percent water on a basis of total weight of the aqueous soil mixture; (b) a plurality of discrete reinforcing fibers for reinforcing the aqueous soil mixture; and (c) an additive for partially solidifying the aqueous soil mixture to form a semi-solid reinforced soil mixture, wherein the semi-solid reinforced soil mixture has a moisture content ranging from about 1 to about 90 weight percent of the total weight of the semi-solid reinforced soil mixture.

Yet another aspect of the present invention is a semi-solid reinforced soil mixture, comprising: (a) an aqueous soil mixture comprising: (i) about 25 to about 90 weight percent mineral soil selected from the group consisting of gravel, sand, silt, clay and mixtures thereof on a basis of total weight of the aqueous soil mixture; (ii) about 5 to about 10 weight percent organic material on a basis of total weight of the aqueous soil mixture; and (iii) about 25 to about 70 weight percent water on a basis of total weight of the aqueous soil mixture; (b) about 0.1 to about 15 weight percent of a plurality of discrete glass reinforcing fibers for reinforcing the semi-solid reinforced soil mixture on a basis of total weight of dry mineral soil; and (c) an additive for partially solidifying the aqueous soil mixture to form a semi-solid reinforced soil mixture, the additive being selected from the group consisting of calcium-containing materials, cementitious materials, silicon-containing materials, aluminum-containing materials and mixtures thereof, wherein the semi-solid reinforced soil mixture has a moisture content ranging from about 25 to about 75 weight percent of the total weight of the semi-solid reinforced soil mixture.

Yet another aspect of the present invention is a soil mixture having deterioratable reinforcing fibers, comprising: (a) a mineral soil selected from the group consisting of gravel, sand, silt, clay and mixtures thereof; and (b) an additive selected from the group consisting of calcium-containing materials, cementitious materials, silicon-containing materials, aluminum-containing materials and mixtures thereof, the additive providing the soil mixture with a pH value greater than 7; and (c) a plurality of discrete deterioratable reinforcing fibers which deteriorate when in admixture within the soil mixture at a pH value greater than 7.

Another aspect of the present invention is a soil mixture having deterioratable reinforcing fibers, comprising: (a) a mineral soil selected from the group consisting of gravel, sand, silt, clay and mixtures thereof; and (b) an additive selected from the group consisting of calcium-containing materials, cementitious materials, silicon-containing materials, aluminum-containing materials and mixtures thereof, the additive providing the soil mixture with a pH value less than 7; and (c) a plurality of deterioratable discrete reinforcing fibers which deteriorate when in admixture within the soil mixture at a pH value less than 7.

Another aspect of the present invention is a method for forming a semi-solid soil mixture, comprising the steps of: (a) providing an aqueous soil mixture comprising: (i) a mineral soil selected from the group consisting of gravel, sand, silt, clay and mixtures thereof; (ii) an organic material; and (iii) about 10 to about 95 weight percent water on a basis of total weight of the aqueous soil mixture, (b) mixing the aqueous soil mixture with a plurality of discrete reinforcing fibers to form a reinforced soil mixture; and (c) mixing the reinforced soil mixture with an additive to partially solidify the reinforced soil mixture to form a semi-solid reinforced soil mixture, such that the semi-solid reinforced soil mixture has a moisture content ranging from about 1 to about 90 weight percent of the total weight of the semi-solid reinforced soil mixture.

Yet another aspect of the present invention is a method for forming a semi-solid soil mixture, comprising the steps of: (a) providing an aqueous soil mixture comprising: (i) a mineral soil selected from the group consisting of gravel, sand, silt, clay and mixtures thereof; (ii) an organic material; and (iii) about 10 to about 95 weight percent water on a basis of total weight of the aqueous soil mixture; (b) partially solidifying the aqueous mixture by mixing the aqueous soil mixture with an additive to form a semi-solid soil mixture; and (c) mixing the semi-solid soil mixture with a plurality of discrete reinforcing fibers to form a semi-solid reinforced soil mixture, such that the semi-solid reinforced soil mixture has a moisture content ranging from about 1 to about 90 weight percent of the total weight of the semi-solid reinforced soil mixture.

Another aspect of the present invention is a method for reinforcing dredge material for use as a reinforced soil mixture, comprising the steps of: (a) providing an aqueous dredge material comprising: (i) a mineral soil selected from the group consisting of gravel, sand, silt, clay and mixtures thereof; (ii) an organic material; and (iii) about 10 to about 95 weight percent water on a basis of total weight of the aqueous dredge material; (b) mixing the aqueous dredge material with a plurality of discrete reinforcing fibers to form a reinforced dredge mixture; and (c) mixing the reinforced dredge mixture with an additive to partially solidify the reinforced dredge mixture to form a semi-solid reinforced soil mixture, such that the semi-solid reinforced soil mixture has a moisture content ranging from about 1 to about 90 weight percent of the total weight of the semi-solid reinforced soil mixture.

Another aspect of the present invention is a method for reinforcing dredge material for use as a reinforced soil mixture, comprising the steps of: (a) providing an aqueous dredge material comprising: (i) a mineral soil selected from the group consisting of gravel, sand, silt, clay and mixtures thereof; (ii) an organic material; and (iii) about 10 to about 95 weight percent water on a basis of total weight of the aqueous dredge material; (b) partially solidifying the aqueous dredge material by mixing the aqueous dredge material with an additive to form a semi-solid soil mixture; and (c) mixing the semi-solid soil mixture with a plurality of discrete reinforcing fibers to form a semi-solid reinforced soil mixture, such that the semi-solid reinforced soil mixture has a moisture content ranging from about 1 to about 90 weight percent of the total weight of the semi-solid reinforced soil mixture.

Another aspect of the present invention is a method for temporarily reinforcing a soil mixture, comprising the steps of: (a) providing an aqueous mixture comprising: (i) a mineral soil selected from the group consisting of gravel, sand, silt, clay and mixtures thereof; and (iii) about 10 to about 95 weight percent water on a basis of total weight of the aqueous mixture; (b) mixing the aqueous mixture with a plurality of discrete reinforcing fibers to form a reinforced mixture; and (c) mixing the reinforced mixture with an additive which provides the soil mixture with a pH greater than 7, such that the reinforcing fibers deteriorate when in admixture within the soil mixture.

Yet another aspect of the present invention is a method for temporarily reinforcing a soil mixture, comprising the steps of: (a) providing an aqueous soil mixture comprising: (i) a mineral soil selected from the group consisting of gravel, sand, silt, clay and mixtures thereof; (iii) about 10 to about 95 weight percent water on a basis of total weight of the aqueous soil mixture; (b) premixing the aqueous soil mixture with an additive; and (c) mixing the premix of step (b) with a plurality of discrete reinforcing fibers to form a semi-solid reinforced soil mixture, wherein the additive provides the semi-solid reinforced soil mixture with a pH greater than 7 such that the reinforcing fibers deteriorate when in admixture with the semi-solid reinforced soil mixture.

Another aspect of the present invention is a method for temporarily reinforcing a soil mixture, comprising the steps of: (a) providing an aqueous mixture comprising: (i) a mineral soil selected from the group consisting of gravel, sand, silt, clay and mixtures thereof; and (iii) about 10 to about 95 weight percent water on a basis of total weight of the aqueous mixture; (b) mixing the aqueous mixture with a plurality of discrete reinforcing fibers to form a reinforced mixture; and (c) mixing the reinforced mixture with an additive which provides the soil mixture with a pH less than 7, such that the reinforcing fibers deteriorate when in admixture within the soil mixture.

Yet another aspect of the present invention is a method for temporarily reinforcing a soil mixture, comprising the steps of: (a) providing an aqueous soil mixture comprising: (i) a mineral soil selected from the group consisting of gravel, sand, silt, clay and mixtures thereof; (iii) about 10 to about 95 weight percent water on a basis of total weight of the aqueous soil mixture; (b) premixing the aqueous soil mixture with an additive; and (c) mixing the premix of step (b) with a plurality of discrete reinforcing fibers to form a semi-solid reinforced soil mixture, wherein the additive provides the semi-solid reinforced soil mixture with a pH less than 7 such that the reinforcing fibers deteriorate when in admixture with the semi-solid reinforced soil mixture.

BRIEF DESCRIPTION OF THE DRAWINGS

The foregoing summary, as well as the following detailed description of the preferred embodiments, will be better understood when read in conjunction with the appended drawings. In the drawings.

DETAILED DESCRIPTION OF THE PREFERRED EMBODIMENTS

The semi-solid and dried reinforced soil mixtures of the present invention enhance the usefulness of aqueous soil mixtures, such as dredge material, as soil material for geotechnical engineering applications such as load bearing applications, erosion control, soil stabilization and vegetation support. In addition, the mixtures of the present invention, used alone or when blended with other construction engineering materials, provide soils having one or more of the following desirable characteristics: high shear strength, low compressibility, good compactibility, high permeability, high ductility, low weight and high density. Soil formulations can be readily tailored to meet specific load or stabilization requirements for applications such as road and building foundations, slopes, fill, artificial coastlines and islands, levies and sound barriers.

The processibility of aqueous soil mixtures is improved by the present invention, in part by reducing the cost and/or time for drying these materials. The soil mixtures of the present invention also provide numerous environmental advantages, including reclamation of dredge material for use as fill and construction soil which would otherwise have to be transported to a remote site and landfilled or deposited into the ocean.

Figure 1:
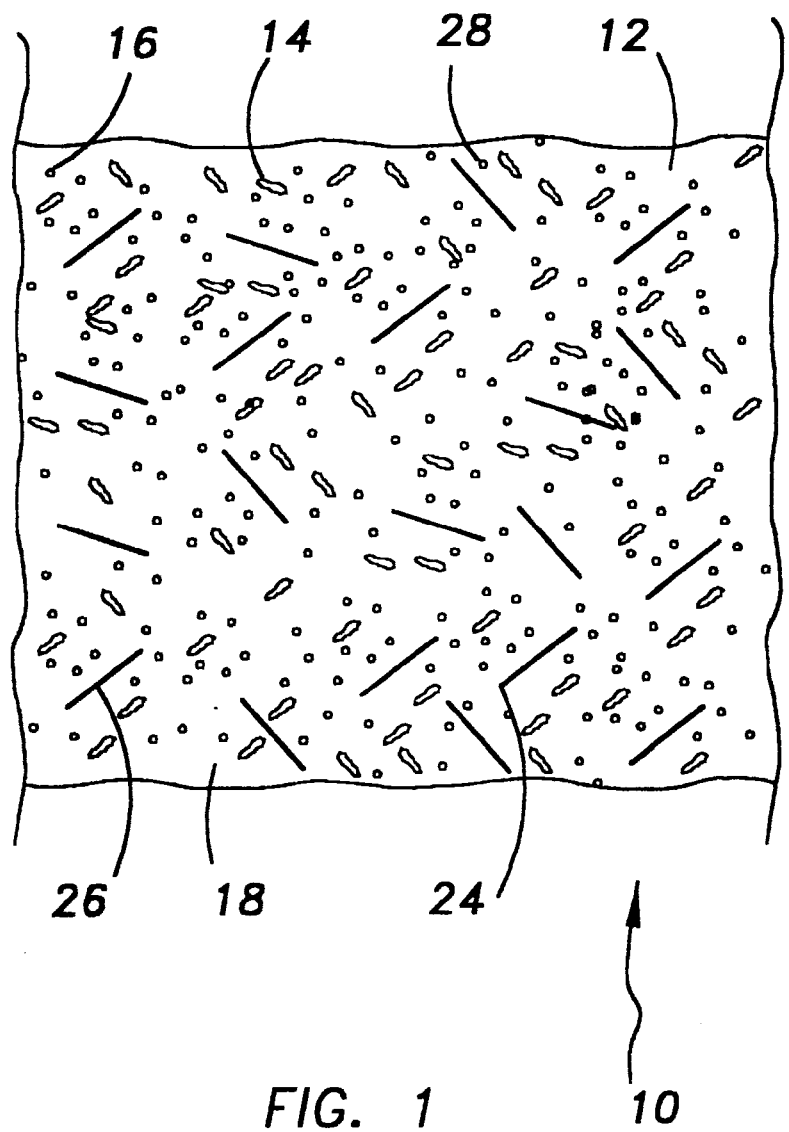
FIG. 1 is an enlarged schematic front elevational view of a portion of a semi-solid reinforced soil mixture, according to the present invention.

Referring to the drawings, wherein like numerals indicate like elements throughout, there is shown in FIG. 1 a portion of a preferred embodiment of a semi-solid reinforced soil mixture, generally designated 10, in accordance with the present invention.

As used herein, the term "mixture" means a heterogeneous association of substances which cannot be represented by a single chemical formula. Its components may or may not be uniformly dispersed and can usually be separated by mechanical means. *Hawley's Condensed Chemical Dictionary* (3d Ed. 1993) at pages 788–789, which are hereby incorporated by reference. The term "semi-solid" as used herein means that the mixture has the qualities of both a solid and a liquid but is more closely related to a solid; partly solid; and/or highly viscous. *Webster's Third New International Dictionary* (1971) at page 2065, which is hereby incorporated by reference.

Figure 2:
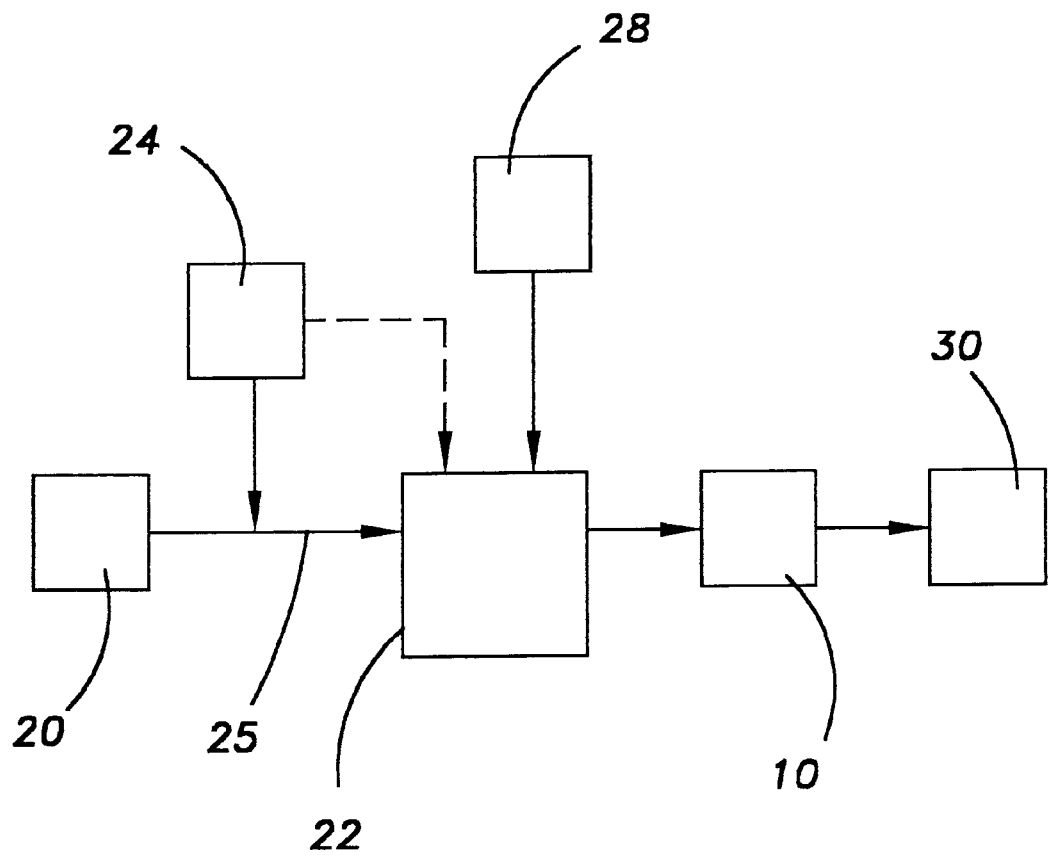
FIG. 2 is a schematic diagram of a system for making the semi-solid reinforced soil mixture of FIG. 1.

The formation of the semi-solid reinforced soil mixture 10 will now be discussed with reference to FIG. 1 and the schematic diagram of a preferred system for forming the semi-solid reinforced soil mixture 10 as shown in FIG. 2.

The semi-solid reinforced soil mixture 10 is formed from one or more aqueous (wet) soil mixtures 12. The aqueous soil mixture 12 comprises one or more inorganic mineral soils 14 selected from the group consisting of gravel, sand, silt, clay and mixtures thereof. Generally, the mineral soil 14 can comprise about 25 to about 90 weight percent of the aqueous soil mixture 12 on a basis of total weight of the aqueous soil mixture. Preferably, the mineral soil 14 comprises about 40 to about 70 weight percent of the aqueous soil mixture and, more preferably about 50 to about 65 weight percent.

As used herein, "gravel" means particles of rocks with occasional particles of quartz, feldspar and other minerals. B. Das, *Principles of Geotechnical Engineering*, (3d Ed. 1994) at page 7, which is hereby incorporated by reference. Gravel can have an average particle size of about 2 mm to about 75 mm according to ASTM Test Method D 3282-92 (1992), which is hereby incorporated by reference. On a basis of total weight of the mineral soil 14, the gravel can comprise about 0.1 to about 10 weight percent, and preferably about 1 to about 5 weight percent.

"Sand" means silicon dioxide sediment particulates such as quartz and feldspar. *Principles of Geotechnical Engineering* at page 7. Sand can have an average particle size ranging from about 0.075 to about 2 mm according to ASTM Test Method D 3282-92 (1992). The sand can comprise about 1 to about 95 weight percent of the mineral soil 14 on a basis of total weight of the mineral soil. Preferably, the sand comprises about 30 to about 60 weight percent of the mineral soil 14.

As used herein, "silt" means microscopic soil fractions that consist of very fine quartz grains and some flake-shaped particles that are fragments of micaceous minerals which have a plasticity index of 10 or less. *Principles of Geotechnical Engineering* at page 7. The plasticity index can be determined according to ASTM Method No. D 4318, which is hereby incorporated by reference. Silt can have an average particle size of less than about 0.075 mm according to ASTM Test Method D 3282-92 (1992). On a basis of total weight of the mineral soil 14, the silt can comprise about 10 to about 90 weight percent. Preferably, the silt comprises about 30 to about 90 weight percent of the mineral soil 14.

"Clay" means one or more hydrated aluminum silicates. *Hawley's* (3d Ed. 1993) at page 288, which is hereby incorporated by reference. Suitable clay materials have a plasticity index of 11 or more. *Principles of Geotechnical Engineering* at pages 7–8, which are hereby incorporated by reference. Clay can have an average particle size of less than about 0.075 mm according to ASTM Test Method D 3282-92 (1992). Non-limiting examples of suitable clay materials include kaolinite, montmorillonite, atapulgite, illite, bentonite, halloysite, vermiculite and mixtures thereof.

Generally, the clay can comprise about 1 to about 90 weight percent of the mineral soil 14 on a basis of total weight of the mineral soil. Preferably, the clay comprises about 10 to about 50 weight percent of the mineral soil 14.

In a preferred embodiment, the aqueous soil mixture 12 comprises one or more organic materials 16, such as organic materials which were naturally deposited during formation of the inorganic mineral soil. Non-limiting examples of such organic materials 16 include one or more of the following: decomposing animal and vegetative matter, sewer spill off, oil products and derivatives thereof. The size of the organic material can range from colloidal to about 2 mm. Generally, the organic materials 16 comprise about 0.1 to about 30 weight percent of the aqueous soil mixture 12. Preferably, the organic materials 16 comprise about 1 to about 20 weight percent of the aqueous soil mixture.

While not preferred, the aqueous soil mixture 12 can comprise one or more metallic waste materials, for example heavy metals such as chromium or lead. If such metallic waste materials are present, it is preferred that the semi-solid reinforced soil mixture 10 include one or more additives 28, discussed in detail below, for inhibiting migration of such metallic waste materials from the semi-solid reinforced soil mixture 10 into the surrounding environment.

The aqueous soil mixture 12, whether or not organic material is present, generally comprises about 10 to about 95 weight percent water 18 on a basis of total weight of the aqueous soil mixture 12. Preferably, the aqueous soil mixture 12 comprises about 30 to about 80 weight percent water and, more preferably, about 40 to about 70 weight percent water. The water 18 can be purified and/or deionized, if desired, although such treatment is not preferred. The aqueous soil mixture can also include minor amounts (less than about 5 weight percent) of liquid contaminants such as oils which can be found in seawater.

The aqueous soil mixture 12 can be formed by mixing the mineral soil 14 with the water 18 by any conventional mixing method, for example by mixing in a tank 22 using an impeller or paddle mixer, such as are discussed in Chilton & Perry, *Chemical Engineers' Handbook* (5th Ed. 1973) at pages 19-3 through 19-14, which are hereby incorporated by reference.

Preferably, the aqueous soil mixture 12 is obtained by excavating dredge material 20 from the floor of a body of water, such as a river, lake, channel or preferably from an ocean. Dredge material 20 generally comprises one or more of the mineral soils 14 and water 18 as discussed in detail above. Dredge material 20 preferably also comprises one or more organic materials 16 such as are discussed above. The dredge material 20 can be used as excavated or additional water can be added to assist in transport, as desired.

The dredge material 20 can be obtained by using dredging equipment such as a dipper dredge, elevator dredge and preferably by use of a hydraulic dredge. In hydraulic dredging, a large, power driven rotary cutter is used to loosen material on the floor of the body of water, such as mineral soils and preferably also organic material. A pipe is placed adjacent to the cutter. A water pump (such as a centrifugal pump) is attached to the opposite end of the pipe which generates a powerful flow of water through the pipe to entrain the loosened dredge material 20 and transport the dredge material 20 to a storage area of a barge or ship or on adjacent land. The dredge material 20 can then be transported using conventional pumping equipment, such as a centrifugal pump, to a tank 22 for mixing with other components such as are discussed below to form the semi-solid soil mixture 10.

The aqueous soil mixture 12 is mixed with a plurality of generally uniformly distributed, randomly oriented discrete reinforcing fibers 24 and/or strands 26 of fibers for reinforcing the aqueous soil mixture 12 to form the semi-solid reinforced soil mixture 10. As used herein, the term "fiber" means an individual filament. The term "strand" as used herein refers to a plurality of filaments or fibers which are present in generally parallel cohesive bundles which resist separation of the adjacent fibers of the respective bundle. Each fiber strand 26 preferably comprises at least about 10 generally parallel filaments and more preferably about 200 to about 1200 filaments.

As used herein, the phrase "randomly oriented" means that the fibers 24 and strands 26 are randomly oriented in three dimensions. The term "discrete" means that the plurality of fibers 24 and/or strands 26 have a mean average length ranging from about 5 to about 500 millimeters, preferably about 5 to about 200 millimeters, and more preferably about 25 to about 100 millimeters. The shape of the fibers 24 and/or strands 26 is preferably generally cylindrical having a generally circular cross-section, although the fibers 24 and/or strands 26 can have different shapes and the surfaces thereof can have protuberances and/or indentations, as desired. The strands 26 can also be in the form of rovings or twisted yarns. Waste fibers, such as downchute waste, are also useful as reinforcing fibers in the present invention.

The reinforcing fibers 24 can be formed from one or more inorganic materials, natural materials, organic polymeric materials, mixtures and combinations thereof.

Inorganic materials suitable for forming reinforcing fibers 24 for use in the present invention include synthetic ceramics and minerals. Suitable ceramics include crystalline and non-crystalline materials. Non-limiting examples of useful non-crystalline ceramics include glass and semi-amorphous polymer-ceramic composites, such as polycarbosilazines and the pyrolysis products thereof. Non-limiting examples of suitable crystalline ceramics include silicon carbide and silicates such as quartz, mullite and alumina. Examples of suitable minerals include mineral wool, sepiolite, palygorskite, talc and asbestos. High performance engineered fibers such as boron fibers are also useful as reinforcing fibers 24 in the present invention.

Glass fibers are the preferred reinforcing fibers 24 for use in the present invention. Glass fibers are generally accepted to be based upon oxide compositions such as silicates selectively modified with other oxide and non-oxide compositions. Useful glass filaments can be formed from any type of fiberizable glass composition known to those skilled in the art, and include those prepared from fiberizable glass compositions such as "E-glass", "A-glass", "C-glass", "D-glass", "R-glass", "S-glass", and E-glass derivatives that are fluorine-free and/or boron-free. Preferred glass filaments are formed from E-glass. Such compositions and methods of making glass filaments therefrom are well known to those skilled in the art and further discussion thereof is not believed to be necessary in view of the present disclosure. If additional information is needed, such glass compositions and fiberization methods are disclosed in K. Loewenstein, *The Manufacturing Technology of Continuous Glass Fibres*, (3d Ed. 1993) at pages 30–44, 47–60, 115–122 and 126–135, which are hereby incorporated by reference.

Natural materials useful in the present invention include, for example, cotton, cellulose, natural rubber, wool and graphite.

Suitable organic polymeric fibers can be formed from a fibrous or fiberizable material prepared from natural or synthetic organic polymers. Polymeric fibers believed to be useful in the present invention are discussed at length in the *Encyclopedia of Polymer Science and Technology*, Vol. 6 (1967) at pages 505–712, which is hereby incorporated by reference. As used herein, the term "fiberizable" means a material capable of being formed into a generally continuous filament, fiber, strand or yarn. Suitable organic fibers include synthetic polymers such as polyamides, polyesters, acrylics, polyolefins, polyurethanes, vinyl polymers, derivatives and mixtures thereof. See *Encyclopedia of Polymer Science and Technology*, Vol. 6 at 506.

Suitable man-made organic fibers can be formed by a variety of polymer extrusion and fiber formation methods, such as for example drawing, melt spinning, dry spinning, wet spinning and gap spinning. Such methods are well known to those skilled in the art and further discussion thereof is not believed to be necessary in view of the present disclosure. If additional information is needed, such methods are disclosed in *Encyclopedia of Polymer Science and Technology*, Vol. 6 at 507–508.

Non-limiting examples of useful polyamide fibers include nylon fibers such as nylon 6 (a polymer of caprolactam), nylon 6,6 (a condensation product of adipic acid and hexamethylenediamine), nylon 12 (which can be made from butadiene) and nylon 10, polyhexamethylene adipamide, polyamide-imides and aramids such as KEVLAR™ fibers, which is commercially available from E. I. duPont de Nemours, Inc. of Wilmington, Del.

Thermoplastic polyester fibers useful in the present invention include those composed of polyethylene terephthalate and polybutylene terephthalate.

Fibers formed from acrylic polymers which are useful in the present invention include polyacrylonitriles having at least about 35% by weight acrylonitrile units, and preferably at least about 85% by weight, which can be copolymerized with other vinyl monomers such as vinyl acetate, vinyl chloride, styrene, vinylpyridine, acrylic esters or acrylamide. See *Encyclopedia of Polymer Science and Technology*, Vol. 6 at 559–561.

Useful polyolefin fibers are generally composed of at least 85% by weight of ethylene, propylene, or other olefins. See *Encyclopedia of Polymer Science and Technology*, Vol. 6 at 561–564.

Fibers formed from vinyl polymers which are useful in the present invention can be formed from polyvinyl chloride, polyvinylidene chloride, polytetrafluoroethylene, and polyvinyl alcohol.

Further examples of thermoplastic fiberizable materials which are useful in the present invention are fiberizable polyimides, polyether sulfones, polyphenyl sulfones; polyetherketones, polyphenylene oxides, polyphenylene sulfides and polyacetals.

It is understood that blends or copolymers of any of the above materials and combinations of fibers formed from any of the above materials can be used in the present invention, if desired. For example, glass fibers formed from two or more different glass compositions or at least partially commingled fibers of glass and an organic polymeric material are useful in the present invention.

Preferably the reinforcing fibers 24 have coated or uncoated surfaces which can increase the viscosity of the mixture 10 and provide pathways to promote capillary movement or wicking of water. Water within the semi-solid reinforced soil mixture 10 migrates to exposed surfaces of the semi-solid reinforced soil mixture 10, thereby facilitating drying and promoting solidification of the aqueous soil mixture 12 and any other liquid components of the semi-solid soil mixture being reinforced. A non-limiting example of reinforcing fibers 24 which can promote water wicking are hydrophilic fibers such as glass fibers. Higher aspect ratio fibers and strands also promote water migration.

The reinforcing fibers 24 can have a nominal filament diameter ranging from about 1 to about 1000 micrometers, and preferably have a nominal filament diameter ranging from about 5 to about 50 micrometers. For further information regarding nominal filament diameters and designations of filaments, see Loewenstein at page 25, which is hereby incorporated by reference.

The reinforcing fibers 24 are present in an amount ranging from at least about 0.01 weight percent to about 25 weight percent of the semi-solid reinforced soil mixture on a basis of total weight of dry mineral soil (including any organic material, if present). The total weight of dry mineral soil is determined by drying a sample of the dry mineral soil (including any organic material, if present) at a temperature of about 150° C. for about 12 hours. Preferably, the reinforcing fibers 24 are present in an amount ranging from about 0.1 weight percent to about 15 weight percent and, more preferably, about 0.5 weight percent to about 5 weight percent of the semi-solid reinforced soil mixture on a basis of total weight of dry mineral soil. In an alternative embodiment, the reinforcing fibers 24 are present in an amount ranging from 5 weight percent to about 25 weight percent, and more preferably about 10 to about 25 weight percent.

The present invention will now be discussed generally with reference to glass fibers as the reinforcing fibers 24, although one skilled in the art would understand that the present invention is not limited to use only with glass fibers but with any of the fibers discussed above. The reinforcing fibers 24 can be at least partially coated with a fiber coating composition to facilitate handling of the same, to provide compatibility the other components of the semi-solid soil mixture and/or to provide resistance to deterioration of the reinforcing fibers 24 when admixed with the other components of the semi-solid soil mixture. As used herein, the phrase "compatible with the components of the reinforced soil mixture" means that the components of the coating composition facilitate wetting of the other components of the semi-solid soil mixture upon the fibers and provide adequate physical properties in the semi-solid reinforced soil mixture.

For coating glass fibers, non-limiting examples of suitable coating compositions include sizing compositions and secondary coating compositions. As used herein, the terms "size", "sized" or "sizing" refer to the aqueous composition applied to the filaments immediately after formation. The term "secondary coating" refers to a coating composition applied secondarily to one or a plurality of strands after the sizing composition is applied, and preferably at least partially dried.

The sizing composition preferably comprises one or more polymeric film-forming materials which are compatible with the components of the semi-solid soil mixture to be reinforced. Non-limiting examples of suitable film-forming materials for use in the present invention include starches, thermoplastic materials, thermosetting materials and mixtures thereof. Preferred polymeric film-forming materials include epoxy and starch film-forming materials. Preferably the polymeric film-forming materials provide resistance to deterioration of the reinforcing fibers 24 by the other components of the semi-solid reinforced soil mixture, such as the additives discussed below.

Useful starches include those prepared from potatoes, corn, wheat, waxy maize, sago, rice, milo and mixtures thereof. A non-limiting example of a useful starch is Kollotex 1250 starch which is a low viscosity, low amylose potato-based starch etherified with ethylene oxide commercially available from AVEBE of the Netherlands.

Examples of suitable thermoplastic and thermosetting film-forming materials include acrylic polymers, aminoplasts, alkyds, polyepoxides, phenolics, polyamides, polyolefins, polyesters, polyurethanes, vinyl polymers, derivatives and mixtures thereof.

Useful acrylic polymers include polymers or copolymers of monomers such as acrylic acid; methacrylic acid; esters of these acids such as acrylates, methacrylates, ethylacrylate, propylacrylate and butylacrylate; polyglycidyl acrylates and methacrylates; acrylamides; acrylonitriles; and copolymers with unsaturated vinyl compounds such as styrene or vinyl acetate. Non-limiting examples of suitable acrylic polymers include FULATEX polymers which are commercially available from H. B. Fuller Co. of St. Paul, Minn.; RHOPLEX acrylic emulsions which are commercially available from Rohm and Haas of Philadelphia, Pa.; and CARBOSET acrylic polymers which are commercially available from B. F. Goodrich Co. of Toledo, Ohio.

Useful aminoplasts include urea-formaldehyde and melamine formaldehyde. Useful epoxides contain at least one epoxy or oxirane group in the molecule, such as polyglycidyl ethers of polyhydric alcohols or thiols. Examples of suitable commercially available epoxy film-forming polymers are EPON® 826 and 828 epoxy resins, which are epoxy functional polyglycidyl ethers of bisphenol A prepared from bisphenol-A and epichlorohydrin and are commercially available from Shell Chemical.

Useful polyamides include the VERSAMID polyamide resins which are commercially available from General Mills Chemicals, Inc. Suitable thermoplastic polyurethanes are condensation products of a polyisocyanate material and a hydroxyl-containing material such as polyol and include, for example, WITCOBONDO® W-290H polyurethane which is commercially available from Witco Chemical Corp. of Chicago, Ill. and RUCO 2011L which is commercially available from Ruco Polymer Corp. of Hicksville, N.Y. Suitable thermosetting polyurethanes include BAYBOND XW-110 polyurethane, which is commercially available from Bayer Corp. of Pittsburgh, Pa.

Non-limiting examples of useful vinyl polymers include RESYN 1971, RESYN 2828 and RESYN 1037 vinyl acetate copolymer emulsions which are commercially available from National Starch and Chemicals of Bridgewater, N.J. Other useful vinyl polymers include polyvinyl pyrrolidones such as PVP K-15, PVP K-30, PVP K-60 and PVP K-90 which are commercially available from ISP Chemicals of Wayne, N.J.

Non-limiting examples of useful polyolefins include polypropylene and polyethylene materials such as the polypropylene emulsion RL-5440, which is commercially available from Sybron Chemicals of Birmingham, N. J., and Polyemulsion CHEMCOR 43C30 polypropylene, which is commercially available from Chemical Corp. of America.

Non-limiting examples of useful polyester materials include RD-847A polyester resin which is commercially available from Borden Chemicals of Columbus, Ohio, STYPOL polyesters which are commercially available from Cook Composites and Polymers of Port Washington, Wis. and NEOXIL polyesters which are commercially available from DSM B.V. of Como, Italy. Thermoplastic polyesters useful in the present invention include ethylene adipates (such as DESMOPHEN 2000 resin) and ethylene butylene adipates (such as DESMOPHEN 2001KS resin), both of which are commercially available from Bayer.

The amount of film-forming material can be about 1 to about 90 weight percent of the sizing composition on a total solids basis, and is preferably about 50 to about 90 weight percent.

The sizing composition preferably comprises one or more glass fiber lubricants. Useful glass fiber lubricants include cationic, non-ionic or anionic lubricants and mixtures thereof. Generally, the amount of fiber lubricant can be about 1 to about 25 weight percent of the sizing composition on a total solids basis.

Non-limiting examples of such fiber lubricants include amine salts of fatty acids (which can, for example, include a fatty acid moiety having 12 to 22 carbon atoms and/or tertiary amines having alkyl groups of 1 to 22 atoms attached to the nitrogen atom ), alkyl imidazoline derivatives (such as can be formed by the reaction of fatty acids with polyalkylene polyamines), acid solubilized fatty acid amides (for example, saturated or unsaturated fatty acid amides having acid groups of 4 to 24 carbon atoms such as stearic amide), condensates of a fatty acid and polyethylene imine and amide substituted polyethylene imines, such as EMERY® 6717 lubricant, which is, a partially amidated polyethylene imine commercially available from Henkel Corporation of Kankakee, Ill.

The sizing composition preferably also comprises one or more coupling agents. These coupling agents typically have dual functionality. Each metal or silicon atom has attached to it one or more groups which can react or compatibilize with the glass filament surface and/or the components of the sizing composition. As used herein, the term "compatibilize" with respect to coupling agents means that the groups are chemically attracted, but not bonded, to the glass filament surface and/or the components of the sizing composition, for example by polar, wetting or salvation forces. Examples of hydrolyzable groups include:

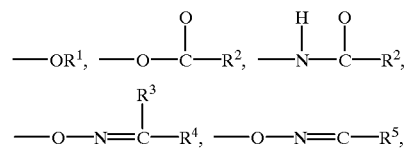

and the monohydroxy and/or cyclic $C_2$–$C_3$ residue of a 1,2– or 1,3 glycol, wherein $R^1$ is $C_1$–$C_3$ alkyl; $R^2$ is H or $C_1$–$C_4$ alkyl; $R^3$ and $R^4$ are independently selected from H, $C_1$–$C_4$ alkyl or $C_6$–$C_8$ aryl; and $R^5$ is $C_4$–$C_7$ alkylene. Examples of suitable compatibilizing or functional groups include epoxy, glycidoxy, mercapto, cyano, allyl, alkyl, urethano, halo, isocyanato, ureido, imidazolinyl, vinyl, acrylato, methacrylato, amino or polyamino groups.

Functional organo silane coupling agents are preferred for use in the present invention. Examples of suitable functional organo silane coupling agents include A-174 gamma-methacryloxypropyltrimethoxysilane and A-1100 gamma-aminopropyltriethoxysilane silane coupling agents, each of which are commercially available from OSi Specialties, Inc. of Tarrytown, N.Y. and Y-5659 amino silane coupling agent. The organo silane coupling agent can be at least partially hydrolyzed with water prior to application to the glass filaments. The amount of coupling agent can be about 1 to about 10 weight percent of the sizing composition on a total solids basis.

Crosslinking materials, such as the aminoplasts discussed above, can also be included in the sizing composition. Non-limiting examples of suitable crosslinkers include melamine formaldehyde, blocked isocyanates, epoxy crosslinkers such as WITCOBOND XW polyurethane by Witco Corp., and polyesters such as are commercially available from Bayer. The amount of crosslinker can be about 1 to about 25 weight percent of the sizing composition on a total solids basis.

The sizing composition can comprise one or more emulsifying agents for emulsifying components of the sizing composition. Non-limiting examples of suitable emulsifying agents or surfactants include polyoxyalkylene block opolymers, ethoxylated alkyl phenols, polyoxyethylene octylphenyl glycol ethers, ethylene oxide derivatives of sorbitol esters and polyoxyethylated vegetable oils. Generally, the amount of emulsifying agent can be about 1 to about 20 weight percent of the sizing composition on a total solids basis.

The sizing composition can also include one or more aqueous dispersible or soluble plasticizers to improve flexibility. Examples of suitable non-aqueous-based plasticizers which are aqueous dispersible plasticizers include phthalates, trimellitates and adipates. An example of an aqueous soluble plasticizer is CARBOWAX 400 polyethylene glycol which is commercially available from Union Carbide of Danbury, Conn. The amount of plasticizer is more preferably less than about 5 weight percent of the sizing composition on a total solids basis.

The sizing composition can include one or more aqueous soluble, emulsifiable or dispersible waxes, such as vegetable, animal, mineral, synthetic or petroleum waxes. Useful petroleum-derived microcrystalline waxes are commercially available from Petrolite Corp. of Tulsa, Okla. and Michelman, Inc. of Cincinnati, Ohio. The amount of wax can be about 1 to about 10 weight percent of the sizing composition on a total solids basis.

Non-limiting examples of non-ionic lubricants useful as components of the sizing composition include vegetable oils and hydrogenated vegetable oils; trimethylolpropane triesters; pentaerythritol tetraesters; derivatives and mixtures thereof. The amount of non-ionic lubricant can be about 1 to about 10 weight percent of the sizing composition on a total solids basis.

Fungicides, bactericides and anti-foaming materials and organic and/or inorganic acids or bases in an amount sufficient to provide the aqueous sizing composition with a pH of about 2 to about 10 can also be included in the sizing composition. Water (preferably deionized) is included in the sizing composition in an amount sufficient to facilitate application of a generally uniform coating upon the strand. The weight percentage of solids of the sizing composition generally can be about 0.5 to about 20 weight percent.

Preferred sizing compositions are disclosed in assignee's U.S. Pat. No. 5,038,555 (which includes an epoxy film-forming material) and U.S. Pat. No. 3,869,308 which are hereby incorporated by reference. Non-limiting examples of other suitable sizing compositions are set forth in Loewenstein at pages 237–291, which are hereby incorporated by reference.

The sizing can be applied in many ways, for example by contacting the filaments with a static or dynamic applicator, spraying or other means as discussed in Loewenstein at pages 165–172, which is hereby incorporated by reference. Preferably the sized glass fibers are not dried prior to addition to the aqueous soil mixture. However, the sized fibers can be dried, if desired, at room temperature or at elevated temperatures to remove excess moisture from the filaments and, if present, cure any curable sizing or secondary coating composition components. Drying of glass fiber forming packages or cakes is discussed in detail in Loewenstein at pages 219–222, which is hereby incorporated by reference. The temperature and time for drying the glass fibers will depend upon such variables as the percentage of solids in the sizing composition, components of the sizing composition and type of glass fibers. After drying, the sizing is typically present on the filaments in an amount ranging from about 0.1 percent to about 1.5 percent by weight.

The sized glass filaments can be gathered together into bundles or strands 14 of generally parallel filaments or roving and can be further treated with a secondary coating composition which can include one or more of the components of the sizing composition discussed above, and is preferably aqueous-based.

Preferably the reinforcing fibers 24 or strands 26 are formed from generally continuous strands which are chopped by a chopper, such as a Model 90 chopper which is commercially available from Finn and Fram, Inc. of California, into discrete lengths, the plurality of reinforcing fibers 24 having a mean average length such as is discussed above. An antistatic agent such as an amine, amide or quaternary salt such as soyadimethylethylammonium ethosulfate can be applied to the fibers or strands prior to collection, if desired.

The reinforcing fibers 24 can be mixed with the aqueous soil mixture 12 by any conventional apparatus for mixing solids and liquids, such as a double blade mixer or pug mill. Preferably the reinforcing fibers 24 and aqueous soil mixture 12 are mixed by injecting the reinforcing fibers into the flow of the aqueous soil mixture 12 and further mixed in a pug mill for about 0.5 hours, although the mixing time can vary based upon such factors as the mixer and batch size. Any conventional pug mill such as are well known to those skilled in the art is useful for mixing the components of the semi-solid reinforced soil mixture.

The moisture content of the semi-solid reinforced soil mixture can be determined by heating a sample of semi-solid reinforced soil mixture 10 to a temperature of about 150° C. for about 12 hours. One skilled in the art would understand that other conventional methods for determining moisture content, such as heating the sample at a temperature of about 300° C. for about 3 to about 4 hours, are useful in the present invention. Preferably the semi-solid reinforced soil mixture 10 has a moisture content ranging from about 1 to about 90 weight percent of the total weight of the semi-solid reinforced soil mixture 10. More preferably, the semi-solid reinforced soil mixture 10 has a moisture content ranging from about 25 to about 90 weight percent, and most preferably about 20 to about 80 weight percent. The presence of a solidifying additive 28 can provide lower moisture contents, as discussed in detail below.

In an alternative preferred embodiment, the semi-solid reinforced soil mixture 10 comprises one or more additives 28 for at least partially solidifying the aqueous soil mixture 12 and any other liquid components of the semi-solid reinforced soil mixture 10 as mixed, if present. Preferably, the additive 28 isolates and/or inhibits migration of metallic waste materials present in the semi-solid reinforced soil mixture 10 into the surrounding environment.

Generally, the additive 28 can be present in an amount ranging from about 0.1 to about 50 weight percent, preferably about 1 to about 10 weight percent, and more preferably about 3 to about 7 weight percent on a basis of total weight of the semi-solid reinforced soil mixture 10. The amount of additive 28 depends in part upon the particular additive(s) selected, the moisture content of components such as the aqueous soil mixture 12 and the desired moisture content of the semi-solid reinforced soil mixture 10 to be formed.

The additive 28 can comprise one or more of the following: calcium-containing materials, cementitious materials, silicon-containing materials, aluminum-containing materials and mixtures thereof.

Suitable calcium-containing materials are selected from calcium oxide (lime), calcium carbonate (limestone), calcium hydroxide (hydrated or slaked lime), calcium sulfate, calcium chloride and mixtures thereof. See Hawley's at pages 201, 204, 205, 208, 699 and 700, which are hereby incorporated by reference. A preferred calcium-containing material is lime.

Suitable cementitious materials for use in the present invention are selected from hydraulic cements, gypsum cements, organic cements, natural cements, Pozzolan cements, slag cements, bituminous materials, fly ash, tars and mixtures thereof.

Suitable hydraulic cements are any mixture of finely ground lime, alumina and silica that will set to a hard product by admixture of water which combines chemically with other ingredients to form a hydrate. Aluminous cement is a hydraulic cement which comprises at least about 30 to 35 weight percent alumina. Portland cement is a hydraulic cement which also includes tetracalcium aluminoferrate, calcium aluminate and calcium silicates, as well as small amounts of magnesia, sodium, potassium and sulfur. See Hawley's at page 239 and Kirk-Othmer, *Encyclopedia of Chemical Technology*, (1964) Volume 4 at pages 684–710, which are hereby incorporated by reference. Cement kiln dust is a preferred cementitious material for use in the present invention. A mixture of about 50 weight percent cement kiln dust and about 50 weight percent lime is another example of a preferred additive 28 for the semi-solid reinforced mixture of the present invention.

Useful gypsum cements include cements which consist essentially of calcium sulfate and are produced by the partial dehydration of gypsum to the hemihydrate $CaSO_4 \cdot \tfrac{1}{2}H_2O$, such as for example plaster of Paris, Keene's cement, Martin's cement, Mack's cement and Parian cement. See Hawley's at page 580, which is hereby incorporated by reference.

Suitable organic cements include any of the various types of rubber cements, silicone adhesives and deKhotinsky cement. See Hawley's at pages 24, 239, 353 and 1036 which are hereby incorporated by reference.

Useful natural cements can be made by burning an argillaceous limestone or a mixture of limestone with clay or shale at a temperature below sintering temperature. See Kirk-Othmer at page 693. Pozzolan cements are formed by intergrinding cement with "materials which, though not cementitious in themselves, contain constituents which will combine with lime at ordinary temperatures in the presence of water to form stable insoluble compounds possessing cementing properties." Kirk-Othmer at page 693. Pozzolans can be found in volcanic tuffs in Europe, rhyolitic tuffs and diatomaceous earth in the United States and many other rocks and can be made artificially from fly ash or by burning clay or shale at temperatures of 600–900° C. See Kirk-Othmer at page 693.

Suitable bituminous materials include a mixture of hydrocarbons, for example asphalts and tars such as coal tar. See Hawley's at pages 100, 155 and 290–291, which are hereby incorporated by reference. Useful fly ash materials include mixtures of alumina, silica, unburned carbon and metallic oxides which can be produced by combustion of powdered coal. See Hawley's at page 533, which is hereby incorporated by reference.

Other useful additives 28 for partially solidifying the aqueous soil mixture 12 can comprise one or more silicon-containing materials. Non-limiting examples of suitable silicon-containing materials include clays, silicas, silicates and mixtures thereof. Suitable clays and silicas are discussed above. Suitable silicates include any of the widely occurring compounds containing silicon, oxygen and one or more metals with or without hydrogen, such as talc, feldspar, mica and sodium silicate. See Hawley's at page 1035, which is hereby incorporated by reference.

One or more aluminum-containing materials can be used as additives 28 for partially solidifying the aqueous soil mixture 12. Suitable aluminum-containing materials include aluminum oxide (alumina), aluminum hydroxide (hydrated alumina) and mixtures thereof. See Hawley's at pages 42 and 47, which are hereby incorporated by reference.

Such additives 28 can have a pH value which is greater than the pH value of the mixture of the other components of the semi-solid soil mixture, such as the aqueous soil mixture and coated reinforcing fibers. Typically, the pH of the aqueous soil mixture ranges from about 6 to about 8 for mineral soils in pure water and for dredge material comprising sea water. In contrast, for example, the additive lime can have a pH ranging from about 13 to about 14. The pH of a soil sample can be determined using a pH sensitive electrode system according to ASTM Method No. D 4972-89 (1989), which is hereby incorporated by reference. The pH of the additive Portland cement suspension can range from about 11 to about 14. When combined, the additive 28 can provide the semi-solid reinforced soil mixture 10 with a pH ranging from about 8 to about 12. Generally, the pH of the dried reinforced soil mixture declines slightly as the mixture ages, for example from a pH of 12 at mixing to a pH of 9 after about one month.

The pH of the semi-solid reinforced soil mixture 10 can affect the integrity of the reinforcing fibers 24. For example, some reinforcing fibers 24, such as glass fibers, can deteriorate or be chemically modified when in admixture with materials having a pH greater than about 10. As used herein, the term "deteriorate" means that the reinforcing fibers 24 lose structural integrity and/or have one or more reduced mechanical properties such as tensile strength, elastic modulus and fracture toughness and can chemically degrade into materials having less structural integrity and/or have reduced mechanical properties. For example, glass fibers can deteriorate into components such as silica gels and alkali oxides. However, this deterioration can be advantageous because the silica gels and alkali oxides can cement or join the particles of the semi-solid reinforced soil mixture together, thereby adding strength and increasing friction and cohesiveness of the soil mixture.

The rate of deterioration depends upon such factors as the pH value and mechanical stresses and strains to which the fibers are subjected. At higher pH values, glass fibers tend to deteriorate more rapidly. In certain soil reinforcement applications, such as beaches, it can be desirable for such deterioration to occur. However, when the semi-solid reinforced soil mixture is to be used as fill or as a support for structures such as buildings, such deterioration is not desirable. For applications in which deterioration of the reinforcing fibers is not desired, reinforcing fibers 24 which do not deteriorate when in admixture with the particular semi-solid soil mixture can be selected and/or the reinforcing fibers 24 can be coated with a protective coating which inhibits deterioration of the reinforcing fibers 24 in the semi-solid soil mixture. For example, sizings or secondary coatings including epoxies, urethanes, acrylics, polyvinyl chlorides and polyesters such as are discussed in detail above can inhibit deterioration of glass reinforcing fibers when the coated fibers are in admixture with a semi-solid soil mixture having a pH greater than about 9 to 10.

Alternatively or additionally, the semi-solid reinforced soil mixture 10 can further comprise one or more pH adjusters or buffering agents for adjusting the pH value of the semi-solid reinforced soil mixture 10 to prevent deterioration of the reinforcing fibers 24 in admixture with the semi-solid reinforced soil mixture 10. Non-limiting examples of suitable buffering agents include calcium carbonate and calcium-magnesium carbonate. The pH of the reinforced semi-solid soil mixture can also be adjusted by addition of an acidic material, such as acetic acid, if the pH of the reinforced semi-solid soil mixture is greater than 7 or the addition of a basic material such as lime, limestone or slaked lime if the pH of the reinforced semi-solid soil mixture is less than 7. The amount of pH adjuster or buffering agent can range from about 0.1 to about 50 weight percent of the semi-solid reinforced soil mixture on a total weight basis.

One skilled in the art would understand that the problem of deterioration of the reinforcing fibers can occur when the reinforcing fibers are admixed within a semi-solid reinforced soil mixture which has a pH less than 7. As discussed above, the selection of the fiber reinforcement, coatings and suitable buffering agents can be used to minimize such deterioration, if desired.

The semi-solid reinforced soil mixture 10 can further comprise one or more dispersing agents for dispersing at least one of the mineral soil 14 and the organic material 16 in the aqueous soil mixture 12. Suitable dispersing agents include peptizing agents or polymeric electrolytes such as condensed sodium silicates, polyphosphates (polymeric polyelectrolytes) and lignin derivatives. Non-limiting examples of suitable dispersing agents include CALGON orthophosphate detergent, which is commercially available from Calgon Corp. of Pittsburgh, Pa.; DARVAN-C polymeric polyelectrolyte which is commercially available from RT Vanderbilt Company; and NARLEX LD-45 polymeric polyelectrolyte which is commercially available from National Starch and Chemical Co. of Bridgewater, N.J. The amount of dispersing agent can range from about 0.1 to about 20 weight percent of the semi-solid reinforced soil mixture 10 on a total weight basis, and preferably about 0.5 to about 2 weight percent.

The semi-solid reinforced soil mixture 10 can further comprise industrial waste, such as chopped or shredded rubber (for example shredded automobile tires having steel, glass fiber or polymer cord reinforcements), cellulosics, plastic, metal, textile products, carpets and automotive fluff, industrial, construction and residential garbage or refuse, and crushed glass. Automotive fluff includes rubber, glass, cellulosics, metals and plastic portions of automobiles such as rubber hoses, water bottles, upholstery and foam which are shredded as reusable waste material. The amount of industrial waste can range from about 1 to about 30 weight percent of the semi-solid reinforced soil mixture 10 on a total weight basis.

The additive 28, pH adjusters, buffering agents, dispersing agents, industrial waste and any other components can be mixed with the aqueous soil mixture 12 either prior to, concurrently with or subsequently to mixing with the reinforcing fibers 24 using any conventional mixing apparatus such as are discussed above. A preferred mixing apparatus is a pug mill. Preferably the reinforcing fibers 24 and aqueous soil mixture 12 are premixed together first and then the additive 28, pH adjusters, buffering agents, dispersing agents, industrial waste and any other components are added to the premix.

Referring now to FIG. 2, the semi-solid reinforced soil mixture 10 is preferably at least partially dried to form a dried reinforced soil mixture 30 having a reduced moisture content of about 1 to about 90 weight percent on a total weight basis, and more preferably about 30 to about 70 weight percent. The semi-solid reinforced soil mixture 10 can be dried by any drying method such as are well known to those skilled in the art, for example by conveying the mixture 10 through a heated oven such that the temperature of the mixture is maintained at about 150° C. for about an hour.

Preferably, the semi-solid reinforced soil mixture 10 is at least partially dried by spreading the material upon a surface having a moisture content less that the mixture 10 (for example, dry soil or rock), to expose the mixture 10 to the environment (sun, air and wind) such that the water in the mixture 10 migrates to the surface of the mixture 10, evaporates from the surface of the mixture 10 to the surrounding air and is conveyed away from the mixture 10 by air movement. Preferably, the mixture 10 is periodically moved or mixed to expose interior portions of the mixture 10 to the environment to facilitate drying. The mixture 10 can be mixed or blended by discs, harrows or graders, for example.

The semi-solid reinforced soil mixture 10 and the dried reinforced soil mixture 30 can be used as ground cover and/or fill for construction applications. The semi-solid reinforced soil mixture 10 and the dried reinforced soil mixture 30 can be mixed, individually or together, with other soil, construction materials and/or reinforcements such as rocks, stones, rip-rap, sand and geotextile grids in any proportion desired.

Methods according to the present invention for forming a semi-solid soil mixture 10 will now be described generally.

With reference to FIG. 2, the method generally comprises the initial step of providing an aqueous soil mixture 12 comprising a mineral soil selected from the group consisting of gravel, sand, silt, clay and mixtures thereof; an organic material if desired; and about 10 to about 95 weight percent water on a basis of total weight of the aqueous soil mixture. The aqueous soil mixture 10 is preferably dredge material 20 which can be supplied from a storage area or dredging operation, as discussed above. The aqueous soil mixture 10 or dredge material 20 is preferably mixed with a plurality of discrete reinforcing fibers to form a reinforced soil mixture 25 in a manner discussed above. The reinforced soil mixture 25 is then preferably mixed with an additive 28 as discussed above to at least partially solidify the reinforced soil mixture 25 to form the semi-solid reinforced soil mixture 10 having a moisture content ranging from about 1 to about 90 weight percent. Preferably, at least a portion of the semi-solid reinforced soil mixture 10 is at least partially dried to form a dried reinforced soil mixture 30.

In an alternative embodiment, the aqueous soil mixture 12 can be at least partially solidified by mixing with the additive 28 to form a semi-solid soil mixture in a manner such as is discussed above. The semi-solid soil mixture is then mixed with a plurality of discrete reinforcing fibers 24 to form a semi-solid reinforced soil mixture 10 having a moisture content ranging from about 1 to about 90 weight percent as discussed above.

Another aspect of the present invention includes methods for reinforcing dredge materials for use as reinforced soil mixtures, which will now be described generally.

The method generally comprises the initial step of providing a dredge material 20 comprising a mineral soil selected from the group consisting of gravel, sand, silt, clay and mixtures thereof; an organic material if desired; and about 10 to about 95 weight percent water on a basis of total weight of the aqueous soil mixture. The aqueous dredge material 20 is preferably mixed with a plurality of discrete reinforcing fibers 24 to form a reinforced dredge mixture, which is subsequently mixed with the additive 28 to partially solidify the reinforced dredge mixture to form a semi-solid reinforced soil mixture 10 having a moisture content ranging from about 1 to about 90 weight percent.

In an alternative embodiment, the aqueous dredge material 20 can be at least partially solidified by mixing with the additive 28 to form a semi-solid soil mixture in a manner such as is discussed above. The semi-solid soil mixture is then mixed with a plurality of discrete reinforcing fibers 24 to form a semi-solid reinforced soil mixture 10 having a moisture content ranging from about 1 to about 90 weight percent as discussed above.

Yet another aspect of the present invention includes methods for temporarily reinforcing a soil mixture, described generally below.

The method generally comprises the initial step of providing an aqueous soil mixture 12 comprising a mineral soil selected from the group consisting of gravel, sand, silt, clay and mixtures thereof; an organic material if desired; and about 10 to about 95 weight percent water on a basis of total weight of the aqueous soil mixture 12. The aqueous soil mixture 12 is mixed with a plurality of discrete reinforcing fibers 24 to form a reinforced mixture, which is then mixed with the additive 28 which provides a soil mixture with a pH greater than 7, such that the reinforcing fibers deteriorate when in admixture within the soil mixture.

In an alternative embodiment, the aqueous soil mixture 12 is premixed with the additive 28 and then mixed with a plurality of discrete reinforcing fibers 24 to form a semi-solid reinforced soil mixture 10, wherein the additive 28 provides the semi-solid reinforced soil mixture 10 with a pH greater than 7 such that the reinforcing fibers 24 deteriorate when in admixture with the semi-solid reinforced soil mixture 10.

The present invention will now be illustrated by the following specific, non-limiting examples.

EXAMPLE

A sample of dredge material obtained from the floor of the Newark harbor was mixed in a blade mixer with about 10 weight percent lime on a basis of total mass of the dredged material. About 10 weight percent cement kiln dust on a basis of total mass of the dredged material was added to the above mixture. The materials were mixed to form a mixture having a generally uniform appearance.

About 3 weight percent on a basis of dry weight of the dredge material of 5509 K filament glass fibers chopped to an average length of about 1 inch, which are commercially available from PPG Industries, Inc. of Pittsburgh, Pa. were mixed with a portion of the above mixture of dredge material, lime kiln dust and cement kiln dust.

After mixing, the sample reinforced with glass fibers ("reinforced sample") and the sample without glass fibers ("unreinforced sample") were each air dried on a plastic tarp to about 30 to about 32 weight percent moisture content. The moisture content of each sample was determined by drying a portion of each sample at a temperature of about 150° C. for about 12 hours.

Each of the reinforced and unreinforced samples was compacted to a density of about 1682 kilograms per cubic meter (about 105 pounds per cubic foot) according to AASHTO TP46-94 for Type 2 soils (which is hereby incorporated by reference) using AASHTO TP46-94 for Type 2 soils compaction equipment.

The shear strength of three specimens of each of the reinforced and unreinforced samples was determined at confining pressures of about 34474 Pascals (5 pounds per square inch (psi)), about 55158 Pascals (8 psi) and about 82737 Pascals (12 psi), respectively, using a 71 centimeter (2.8 inch) diameter triaxial cell and MTS "Soil Machine" according to ASTM Method No. D 2850-87 (1987) for testing unconsolidated, undrained compressive strength of cohesive soils in triaxial compression, which is hereby incorporated by reference, except that the axial strain was evaluated at a rate of 0.1 percent axial strain per minute. Load and deformation values were determined as a function of strain for every 0.002 inches of axial deformation of each sample.

Figure 3:
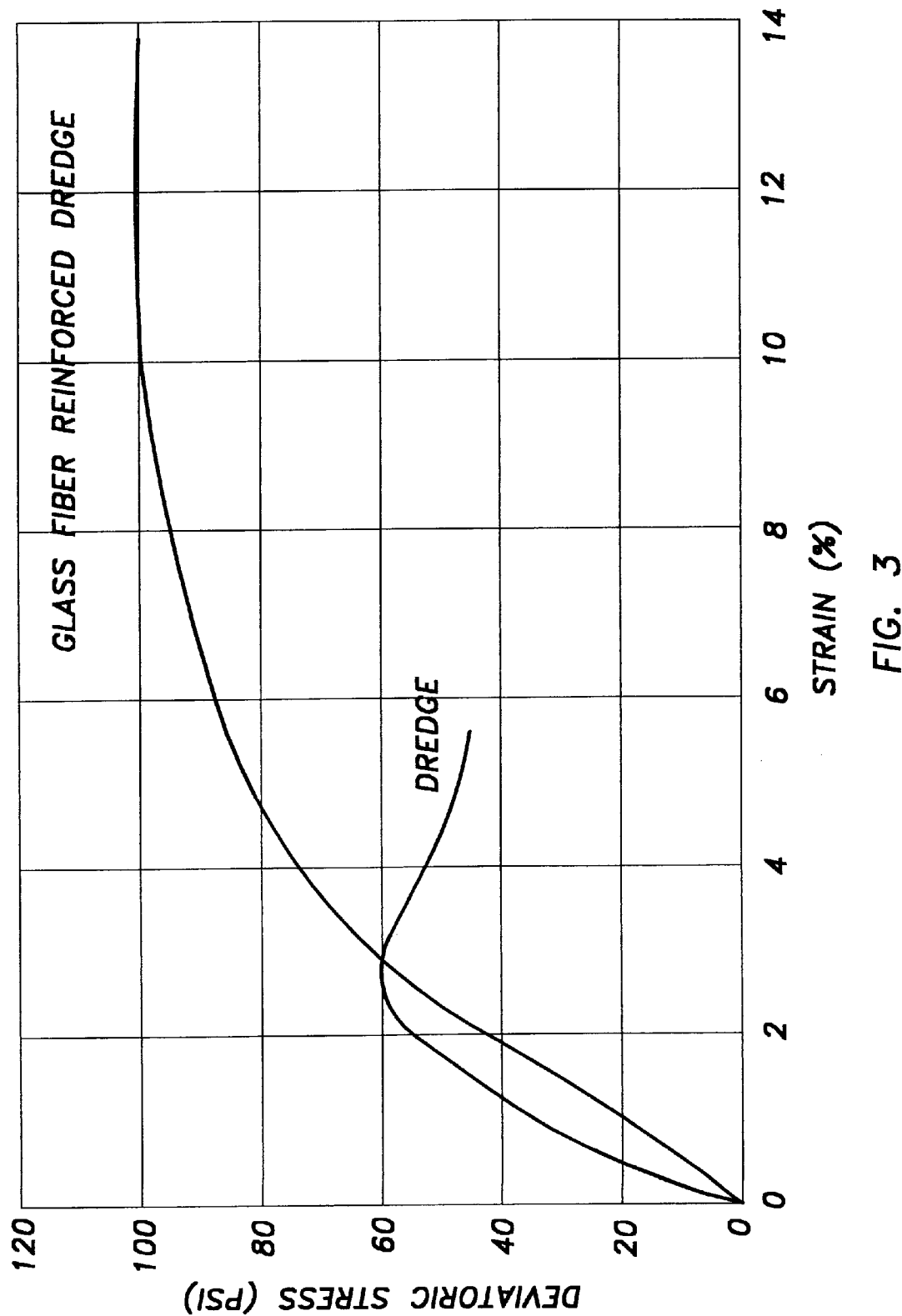
FIG. 3 is a graph of triaxial test results for deviatoric stress (pounds per square inch (psi)) as a function of percent strain at a confining pressure of 5 psi.

FIG. 3 is a graph of triaxial test results for deviatoric stress (psi) as a function of percent strain at a confining pressure of 5 psi for a glass fiber reinforced mixture sample and an unreinforced mixture sample.

Figure 4:
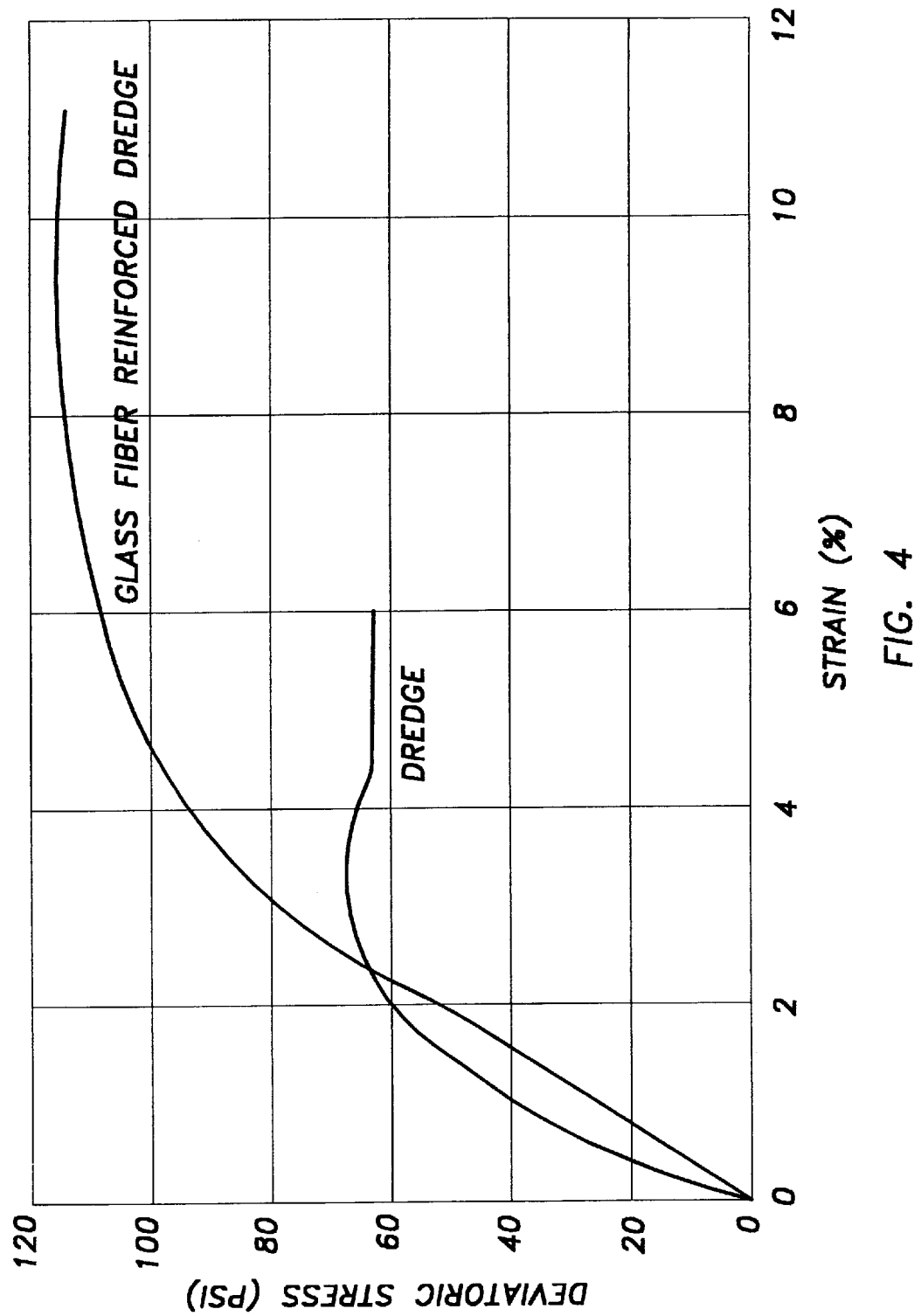
FIG. 4 is a graph of triaxial test results for deviatoric stress (pounds per square inch (psi)) as a function of percent strain at a confining pressure of 8 psi.

FIG. 4 is a graph of triaxial test results for deviatoric stress (psi) as a function of percent strain at a confining pressure of 8 psi for a glass fiber reinforced mixture sample and an unreinforced mixture sample.

Figure 5:
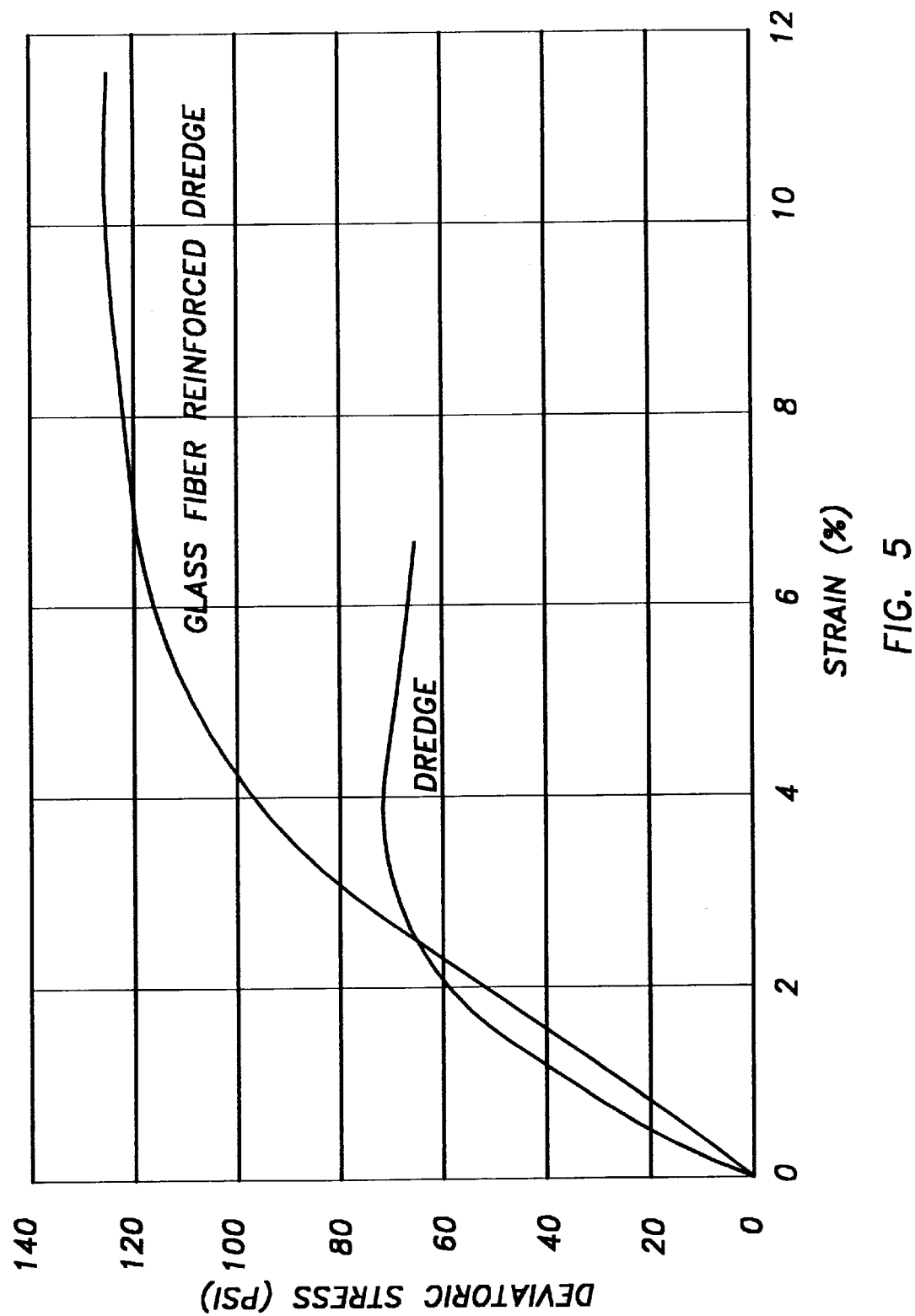
FIG. 5 is a graph of triaxial test results for deviatoric stress (pounds per square inch (psi)) as a function of percent strain at a confining pressure of 12 psi.

FIG. 5 is a graph of triaxial test results for deviatoric stress (psi) as a function of percent strain at a confining pressure of 12 psi for a glass fiber reinforced mixture sample and an unreinforced mixture sample.

As shown in FIGS. 3–5, the peak strengths of the fiber reinforced samples are higher than the respective peak strengths of the corresponding unreinforced samples. Additionally, the amount of strain to reach failure at the peak strength is greater for the fiber reinforced samples than the respective corresponding unreinforced samples. Further, the initial tangent modulus of the samples reinforced with glass fibers is not increased versus corresponding samples without glass fibers. Within the range of confining pressures evaluated, the samples including glass fibers had higher cohesion and slightly increased friction angles versus samples without glass fibers.

The semi-solid and dried reinforced soil mixtures and methods of the present invention enhance the processing and usefulness of aqueous soil mixtures, such as dredge material, for geotechnical engineering applications. The physical properties of the mixtures of the present invention can be tailored to suit specific construction and fill applications, providing soils having one or more of the following advantageous characteristics: high shear strength, low compressibility, good compactibility, high permeability, high ductility, low weight and high density.

It will be appreciated by those skilled in the art that changes could be made to the embodiments described above without departing from the broad inventive concept thereof. It is understood, therefore, that this invention is not limited to the particular embodiments disclosed, but it is intended to cover modifications which are within the spirit and scope of the invention, as defined by the appended claims.

Therefore, we claim:

1. A semi-solid reinforced soil mixture, comprising:
   (a) an aqueous soil mixture comprising:
      (i) about 40 to about 70 weight percent mineral soil on a basis of the total weight of the aqueous soil mixture, consisting of:
         (1) about 1 to about 5 weight percent gravel on a basis of the total weight of the mineral soil;
         (2) about 30 to about 60 weight percent sand on a basis of the total weight of the mineral soil;
         (3) about 30 to about 90 weight percent silt on a basis of the total weight of the mineral soil; and
         (4) about 10 to about 50 weight percent clay on a basis of the total weight of the mineral soil;
      (ii) about 1 to about 20 weight percent organic material on a basis of total weight of the aqueous soil mixture; and
      (iii) about 10 to about 95 weight percent water on a basis of total weight of the aqueous soil mixture; and
   (b) about 0.1 to about 15 weight percent of a plurality of discrete glass reinforcing fibers for reinforcing the semi-solid reinforced soil mixture on a basis of total weight of dry mineral soil.

2. The reinforced soil mixture according to claim 1, wherein the semi-solid reinforced soil mixture has a moisture content ranging from about 1 to about 90 weight percent of the total weight of the semi-solid reinforced soil mixture.

3. The reinforced soil mixture according to claim 2, wherein the semi-solid reinforced soil mixture has a moisture content ranging from about 25 to about 60 weight percent of the total weight of the semi-solid reinforced soil mixture.

4. The reinforced soil mixture according to claim 1, wherein the aqueous soil mixture comprises dredge material.

5. The reinforced soil mixture according to claim 1, wherein the organic material comprises a component selected from the group consisting of decomposing animal and vegetative matter, sewer spill off, oil products and derivatives thereof.

6. The reinforced soil mixture according to claim 1, wherein the reinforcing fibers are formed from materials selected from the group consisting of inorganic materials, natural materials, organic polymeric materials and mixtures and combinations thereof.

7. The reinforced soil mixture according to claim 6, wherein the reinforcing fibers comprise fibers formed from an inorganic material which is glass.

8. The reinforced soil mixture according to claim 1, further comprising an additive for partially solidifying the aqueous soil mixture to form the semi-solid reinforced soil mixture, wherein the semi-solid reinforced soil mixture has a moisture content ranging from about 1 to about 90 weight percent of the total weight of the semi-solid reinforced soil mixture.

9. The reinforced soil mixture according to claim 8, wherein the additive comprises about 0.1 to about 50 weight percent of the semi-solid reinforced soil mixture on a basis of total weight of the semi-solid reinforced soil mixture.

10. The reinforced soil mixture according to claim 8, wherein the additive for partially solidifying the aqueous soil mixture comprises a calcium-containing material.

11. The reinforced soil mixture according to claim 10, wherein the calcium-containing material is selected from the group consisting of calcium is oxide, calcium carbonate, calcium hydroxide, calcium sulfate, calcium chloride and mixtures thereof.

12. The reinforced soil mixture according to claim 8, wherein the additive for partially solidifying the aqueous soil mixture comprises a cementitious material.

13. The reinforced soil mixture according to claim 12, wherein the cementitious material is selected from the group consisting of hydraulic cements, gypsum cements, organic cements, natural cements, Pozzolan cements, slag cements, bituminous materials, fly ash, tars and mixtures thereof.

14. The reinforced soil mixture according to claim 8, wherein the additive for partially solidifying the aqueous soil mixture comprises a silicon-containing material.

15. The reinforced soil mixture according to claim 14, wherein the silicon-containing material is selected from the group consisting of clays, silicas, silicates and mixtures thereof.

16. The reinforced soil mixture according to claim 8, wherein the additive for partially solidifying the aqueous soil mixture comprises an aluminum-containing material.

17. The reinforced soil mixture according to claim 16, wherein the aluminum-containing material is selected from the group consisting of aluminum oxide, aluminum hydroxide and mixtures thereof.

18. The reinforced soil mixture according to claim 8, wherein the semi-solid reinforced soil mixture has a pH value greater than 7.

19. The reinforced soil mixture according to claim 18, wherein at least a portion of the reinforcing fibers deteriorate in admixture with the semi-solid reinforced soil mixture having a pH value greater than 7.

20. The reinforced soil mixture according to claim 1, wherein the semi-solid reinforced soil mixture further comprises a buffering agent for adjusting a pH value of the semi-solid reinforced soil mixture to prevent deterioration of the reinforcing fibers in admixture with the semi-solid reinforced soil mixture.

21. The reinforced soil mixture according to claim 1, wherein the semi-solid reinforced soil mixture further comprises a dispersing agent for dispersing at least one of the mineral soil and the organic material in the aqueous soil mixture.

22. The reinforced soil mixture according to claim 1, wherein the semi-solid reinforced soil mixture further comprises industrial waste.

23. The reinforced soil mixture according to claim 22, wherein the industrial waste is selected from the group consisting of rubber, glass, cellulosics, metals and plastics.

24. A dried reinforced soil mixture formed by at least partially drying the semi-solid reinforced soil mixture of claim 1.

25. Fill material for construction applications comprising the dried reinforced soil mixture of claim 24.

26. Fill material for construction applications comprising the semi-solid reinforced soil mixture of claim 1.

27. A semi-solid reinforced soil mixture, comprising:
 (a) an aqueous soil mixture comprising:
  (i) about 40 to about 70 weight percent mineral soil on a basis of the total weight of the aqueous soil mixture, consisting of:
   (1) about 1 to about 5 weight percent gravel on a basis of the total weight of the mineral soil;
   (2) about 30 to about 60 weight percent sand on a basis of the total weight of the mineral soil;
   (3) about 30 to about 90 weight percent silt on a basis of the total weight of the mineral soil; and
   (4) about 10 to about 50 weight percent clay on a basis of the total weight of the mineral soil;
  (ii) about 1 to about 20 weight percent organic material on a basis of total weight of the aqueous soil mixture; and
  (iii) about 10 to about 95 weight percent water on a basis of total weight of the aqueous soil mixture;
 (b) about 0.1 to about 15 weight percent of a plurality of discrete glass reinforcing fibers for reinforcing the semi-solid reinforced soil mixture on a basis of total weight of dry mineral soil; and
 (c) an additive for partially solidifying the aqueous soil mixture to form a semi-solid reinforced soil mixture, wherein the semi-solid reinforced soil mixture has a moisture content ranging from about 1 to about 90 weight percent of the total weight of the semi-solid reinforced soil mixture.

28. A dried reinforced soil mixture formed by at least partially drying the semi-solid reinforced soil mixture of claim 27.

29. Fill material for construction applications comprising the dried reinforced soil mixture of claim 28.

30. Fill material for construction applications comprising the semi-solid reinforced soil mixture of claim 27.

31. A semi-solid reinforced soil mixture, comprising:
 (a) an aqueous soil mixture comprising:
  (i) about 40 to about 70 weight percent mineral soil on a basis of the total weight of the aqueous soil mixture, consisting of:
   (1) about 1 to about 5 weight percent gravel on a basis of the total weight of the mineral soil;
   (2) about 30 to about 60 weight percent sand on a basis of the total weight of the mineral soil;
   (3) about 30 to about 90 weight percent silt on a basis of the total weight of the mineral soil; and
   (4) about 10 to about 50 weight percent clay on a basis of the total weight of the mineral soil;
  (ii) about 1 to about 20 weight percent organic material on a basis of total weight of the aqueous soil mixture; and
  (iii) about 10 to about 95 weight percent water on a basis of total weight of the aqueous soil mixture; and
 (b) about 0.1 to about 15 weight percent of a plurality of discrete glass reinforcing fibers for reinforcing the semi-solid reinforced soil mixture on a basis of total weight of dry mineral soil; and (c) an additive for partially solidifying the aqueous soil mixture to form a semi-solid reinforced soil mixture, the additive being selected from the group consisting of calcium-containing materials, cementitious materials, silicon-containing materials, aluminum-containing materials and mixtures thereof, wherein the semi-solid reinforced soil mixture has a moisture content ranging from about 25 to about 75 weight percent of the total weight of the semi-solid reinforced soil mixture.

32. A dried reinforced soil mixture formed by at least partially drying the semi-solid reinforced soil mixture of claim 31.

33. Fill material for construction applications comprising the dried reinforced soil mixture of claim 32.

34. Fill material for construction applications comprising the semi-solid reinforced soil mixture of claim 31.

35. A semi-solid reinforced soil mixture, comprising:
(a) a soil mixture, consisting of:
 (i) about 1 to about 5 weight percent gravel on a basis of the total weight of the soil mixture;
 (ii) about 30 to about 60 weight percent sand on a basis of the total weight of the soil mixture;
 (iii) about 30 to about 90 weight percent silt on a basis of the total weight of the soil mixture; and
 (iv) about 10 to about 50 weight percent clay on a basis of the total weight of the soil mixture;
(b) an additive selected from the group consisting of calcium-containing materials, cementitious materials, silicon-containing materials, aluminum-containing materials and mixtures thereof, the additive providing the soil mixture with a pH value greater than 7; and
(c) about 0.1 to about 15 weight percent of a plurality of deterioratable discrete glass reinforcing fibers on a basis of total weight of dry soil mixture which deteriorate when in admixture within the soil mixture at a pH value greater than 7.

36. The soil mixture according to claim 35, further comprising an organic material.

37. A dried soil mixture formed by at least partially drying the soil mixture of claim 35.

38. Fill material for construction applications comprising the dried soil mixture of claim 37.

39. A method for temporarily reinforcing a soil mixture, comprising the steps of:
(a) providing an aqueous mixture comprising:
 (i) about 40 to about 70 weight percent mineral soil on a basis of the total weight of the aqueous soil mixture, consisting of:
  (1) about 1 to about 5 weight percent gravel on a basis of the total weight of the mineral soil;
  (2) about 30 to about 60 weight percent sand on a basis of the total weight of the mineral soil;
  (3) about 30 to about 90 weight percent silt on a basis of the total weight of the mineral soil; and
  (4) about 10 to about 50 weight percent clay on a basis of the total weight of the mineral soil;
 (ii) about 1 to about 20 weight percent organic material on a basis of total weight of the aqueous soil mixture; and
 (iii) about 10 to about 95 weight percent water on a basis of total weight of the aqueous mixture;
(b) mixing the aqueous mixture with a plurality of discrete reinforcing fibers to form a reinforced mixture; and
(c) mixing the reinforced mixture with an additive which provides the soil mixture with a pH less than 7, such that the reinforcing fibers deteriorate when in admixture within the soil mixture.

40. A method for temporarily reinforcing a soil mixture, comprising the steps of:
(a) providing an aqueous soil mixture comprising:
 (i) about 40 to about 70 weight percent mineral soil on a basis of the total weight of the aqueous soil mixture, consisting of:
  (1) about 1 to about 5 weight percent gravel on a basis of the total weight of the mineral soil;
  (2) about 30 to about 60 weight percent sand on a basis of the total weight of the mineral soil;
  (3) about 30 to about 90 weight percent silt on a basis of the total weight of the mineral soil; and
  (4) about 10 to about 50 weight percent clay on a basis of the total weight of the mineral soil;
 (ii) about 1 to about 20 weight percent organic material on a basis of total weight of the aqueous soil mixture; and
 (iii) about 10 to about 95 weight percent water on a basis of total weight of the aqueous soil mixture;
(b) premixing the aqueous soil mixture with an additive; and
(c) mixing the premix of step (b) with a plurality of discrete reinforcing fibers to form a semi-solid reinforced soil mixture, wherein the additive provides the semi-solid reinforced soil mixture with a pH less than 7 such that the reinforcing fibers deteriorate when in admixture with the semi-solid reinforced soil mixture.

41. A semi-solid reinforced soil mixture, comprising:
(a) a soil mixture, consisting of:
 (i) about 1 to about 5 weight percent gravel on a basis of the total weight of the soil mixture;
 (ii) about 30 to about 60 weight percent sand on a basis of the total weight of the soil mixture,
 (iii) about 30 to about 90 weight percent silt on a basis of the total weight of the soil mixture; and
 (iv) about 10 to about 50 weight percent clay on a basis of the total weight of the soil mixture;
(b) an additive selected from the group consisting of calcium-containing materials, cementitious materials, silicon-containing materials, aluminum-containing materials and mixtures thereof, the additive providing the soil mixture with a pH value less than 7; and
(c) about 0.1 to about 15 weight percent of a plurality of deterioratable discrete glass reinforcing fibers on a basis of total weight of dry soil mixture which deteriorate when in admixture within the soil mixture at a pH value less than 7.

* * * * *